United States Patent
Bae et al.

(10) Patent No.: US 8,312,180 B2
(45) Date of Patent: Nov. 13, 2012

(54) ADDRESS MANAGEMENT METHOD AND VIDEO APPARATUS USING THE SAME

(75) Inventors: Dae-gyu Bae, Suwon-si (KR); Jin-woo Hong, Suwon-si (KR); Dong-young Kim, Seongnam-si (KR); Ho-jeong You, Suwon-si (KR); Si-hong Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 95 days.

(21) Appl. No.: 11/954,767

(22) Filed: Dec. 12, 2007

(65) Prior Publication Data

US 2008/0281995 A1 Nov. 13, 2008

(30) Foreign Application Priority Data

May 8, 2007 (KR) ........................ 10-2007-0044587

(51) Int. Cl.
*G06F 3/00* (2006.01)
*G06F 15/177* (2006.01)
(52) U.S. Cl. .............................. 710/16; 710/19; 709/221
(58) Field of Classification Search .................. 358/479; 710/16, 10, 19, 15; 709/221
See application file for complete search history.

(56) References Cited

U.S. PATENT DOCUMENTS

| | | | | |
|---|---|---|---|---|
| 6,856,254 B1* | 2/2005 | Tanaka et al. | ................. | 340/687 |
| 7,191,275 B2* | 3/2007 | Arackal et al. | ................ | 710/302 |
| 7,386,641 B2* | 6/2008 | Xu et al. | ........................ | 710/19 |
| 7,694,017 B2* | 4/2010 | Saitoh | ........................... | 709/245 |
| 7,849,218 B2* | 12/2010 | Funabiki et al. | ............... | 709/245 |
| 2002/0016858 A1* | 2/2002 | Sawada et al. | ................. | 709/238 |
| 2003/0225893 A1* | 12/2003 | Roese et al. | .................... | 709/227 |
| 2004/0081099 A1* | 4/2004 | Patterson et al. | ............ | 370/241 |
| 2004/0143847 A1* | 7/2004 | Suzuki et al. | .................... | 725/61 |
| 2005/0111063 A1* | 5/2005 | Shar et al. | ...................... | 358/514 |
| 2006/0280055 A1* | 12/2006 | Miller et al. | ............... | 369/44.11 |
| 2007/0036158 A1* | 2/2007 | Hun-Kwon et al. | .......... | 370/389 |
| 2007/0057931 A1* | 3/2007 | Takamori | ...................... | 345/204 |
| 2007/0186015 A1* | 8/2007 | Taft et al. | ......................... | 710/16 |
| 2007/0220150 A1* | 9/2007 | Garg | ........................... | 709/226 |
| 2007/0253413 A1* | 11/2007 | Citron et al. | .................. | 370/389 |
| 2007/0274311 A1* | 11/2007 | Yang | ............................. | 370/392 |
| 2007/0292135 A1* | 12/2007 | Guo et al. | ...................... | 398/106 |
| 2008/0005310 A1* | 1/2008 | Xu et al. | ....................... | 709/224 |
| 2008/0080021 A1* | 4/2008 | Ohkita | ........................... | 358/479 |
| 2008/0162725 A1* | 7/2008 | Kambhatla | ................... | 709/245 |
| 2008/0244097 A1* | 10/2008 | Candelore et al. | ................ | 710/5 |
| 2009/0091658 A1* | 4/2009 | Hirose | .......................... | 348/569 |
| 2010/0235483 A1* | 9/2010 | Kambhatla | ................... | 709/222 |

* cited by examiner

*Primary Examiner* — Ernest Unelus (74) *Attorney, Agent, or Firm* — Sughrue Mion, PLLC

(57) ABSTRACT

An address management method and a video apparatus using the same are provided. The address management method includes determining whether an external device is connected or not; when determining the connection to the external device, generating an invalidation message for invalidating an address; and transmitting the generated invalidation message to the external device. Accordingly, when the port connection is changed, the physical address can be correctly updated by invalidating the former physical address.

23 Claims, 5 Drawing Sheets

CEC Table 5 Logical Addresses

| Logical Address | Device |
|---|---|
| 0 | TV |
| 1 | Recording Device 1 |
| 2 | Recording Device 2 |
| 3 | Tuner 1 |
| 4 | Playback Device 1 |
| 5 | Audio System |
| 6 | Tuner 2 |
| 7 | Tuner 3 |
| 8 | Playback Device 2 |
| 9 | Recording Device 3 |
| 10 | Tuner 4 |
| 11 | Playback Device 3 |
| 12 | Reserved |
| 13 | Reserved |
| 14 | Free Use |
| 15 | Unregistered (as initiator address) Broadcast (as destination address) |

ADDRESS MANAGEMENT METHOD AND VIDEO APPARATUS USING THE SAME

CROSS-REFERENCE TO RELATED APPLICATIONS

This application claims priority from Korean Patent Application No. 10-2007-0044587, filed on May 8, 2007, in the Korean Intellectual Property Office, the disclosure of which is incorporated herein by reference in its entirety.

BACKGROUND OF THE INVENTION

1. Field of the Invention

Apparatuses and methods consistent with the present invention relate to controlling a video apparatus. More particularly, apparatuses and methods consistent with the present invention relate to an address management method of a video apparatus.

2. Description of the Related Art

High Definition Multimedia Interface (HDMI) is a digital interface based on the Digital Video Interactive (DVI) standard for connecting a PC to a monitor, and enables to transmit and receive high-definition video and audio.

The HDMI has three independent channels of Transition Minimized Differential Signaling (TMDS), Display Data Channel (DDC), and Consumer Electronics Control (CEC), as a single physical cable to transmit and receive AV data, device information, and control commands.

In general, for the devices connected through the HDMI cable, a device positioned at the highest level of a link receiving AV data is called a sink and a device transmitting the AV data is called a source.

Particularly, in the CEC operation, when the source acquires a logical address and a physical address, service between the sink and the source is commenced. The logical address is allocated by pinging adjacent devices, and the physical address is allocated through HDMI Hot Plug Detection (HPD).

In the meantime, when the source having an audio function is connected to the sink, the physical address may mismatch because of the HPD restraint.

In more detail, the source having the audio function is connected to a specific port of the sink through the HDMI cable, and a user may change the sink port connected to the HDMI cable. Although the port of the sink is changed, if the source does not perform the HPD, the sink can determine that another source newly connected to the port has the audio function. As a result, a malfunction may occur in the audio function such as volume adjustment.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a video apparatus and a control method thereof for correctly updating a physical address by invalidating a former physical address when a port connection is changed.

According to an aspect of the present invention, an address management method comprises determining whether an external device is connected or not; when determining the connection to the external device, generating an invalidation message for invalidating an address; and transmitting the generated invalidation message to the external device.

The address relating to the audio function may be a physical address of a video apparatus which is assigned a logical address relating to the audio function.

The external device may be connected according to a High Definition Multimedia Interface (HDMI) Consumer Electronics Control (CEC) specification.

The address management method may further comprise acquiring a physical address through a Hot Plug Detection (HPD); and communicating data with the external device using the acquired physical address.

The invalidation message generating operation may be performed when a multifunction device is in a standby mode, and the physical address acquiring operation may be performed when the multifunction device is turned on.

The invalidation message generating operation may comprise a control signal for invalidating the address in an OPCODE area of the invalidation message.

The connection determining operation may determine whether a port of the connected external device is changed or not.

According to the aspect of the present invention, an address management method of a video system including a first video apparatus and a second apparatus comprises determining, at the first video apparatus, whether the second video apparatus is connected; when determining the connection of the second video apparatus, generating, at the first video apparatus, an invalidation message to invalidate an address relating to an audio function; transmitting, at the first video apparatus, the generated invalidation message to the second video apparatus; and invalidating, at the second video apparatus, an address relating to the audio function based on the received invalidation message.

According to the aspect of the present invention, a video apparatus comprises a first controller which determines whether an external device is connected and generates an invalidation message to invalidate an address when the connection of the external device is determined; and an interface which transmits the generated invalidation message to the external device.

The address relating to the audio function may be a physical address of a video apparatus which is assigned a logical address relating to the audio function.

The external device may be connected according to a HDMI CEC specification.

The video apparatus may further comprise a second controller which acquires a physical address through a Hot Plug Detection (HPD), and communicates data with the external device using the acquired physical address.

The first controller may generate the invalidation message in a standby mode of the video apparatus, and the second controller may acquire a physical address in a power on mode of the video apparatus.

The first controller may comprise a control signal for invalidating the address in an OPCODE area of the invalidation message.

The first controller may determine the connectivity of the external device by checking whether a port of the connected external device is changed or not.

According to the aspect of the present invention, a video apparatus comprises an interface which receives an invalidation message to invalidate an address relating to an audio function; and a controller which invalidates the address relating to the audio function included in the invalidation message by parsing the invalidation message.

BRIEF DESCRIPTION OF THE DRAWING FIGURES

The above and/or other aspects of the present invention will be more apparent by describing certain exemplary embodiments of the present invention with reference to the accompanying drawings, in which.

DETAILED DESCRIPTION OF EXEMPLARY EMBODIMENTS

Certain exemplary embodiments of the present invention will now be described in greater detail with reference to the accompanying drawings.

In the following description, same drawing reference numerals are used for the same elements even in different drawings. The matters defined in the description, such as detailed construction and elements, are provided to assist in a comprehensive understanding of the invention. Thus, it is apparent that the present invention can be carried out without those specifically defined matters. Also, well-known functions or constructions are not described in detail since they would obscure the invention with unnecessary detail.

Figure 1:
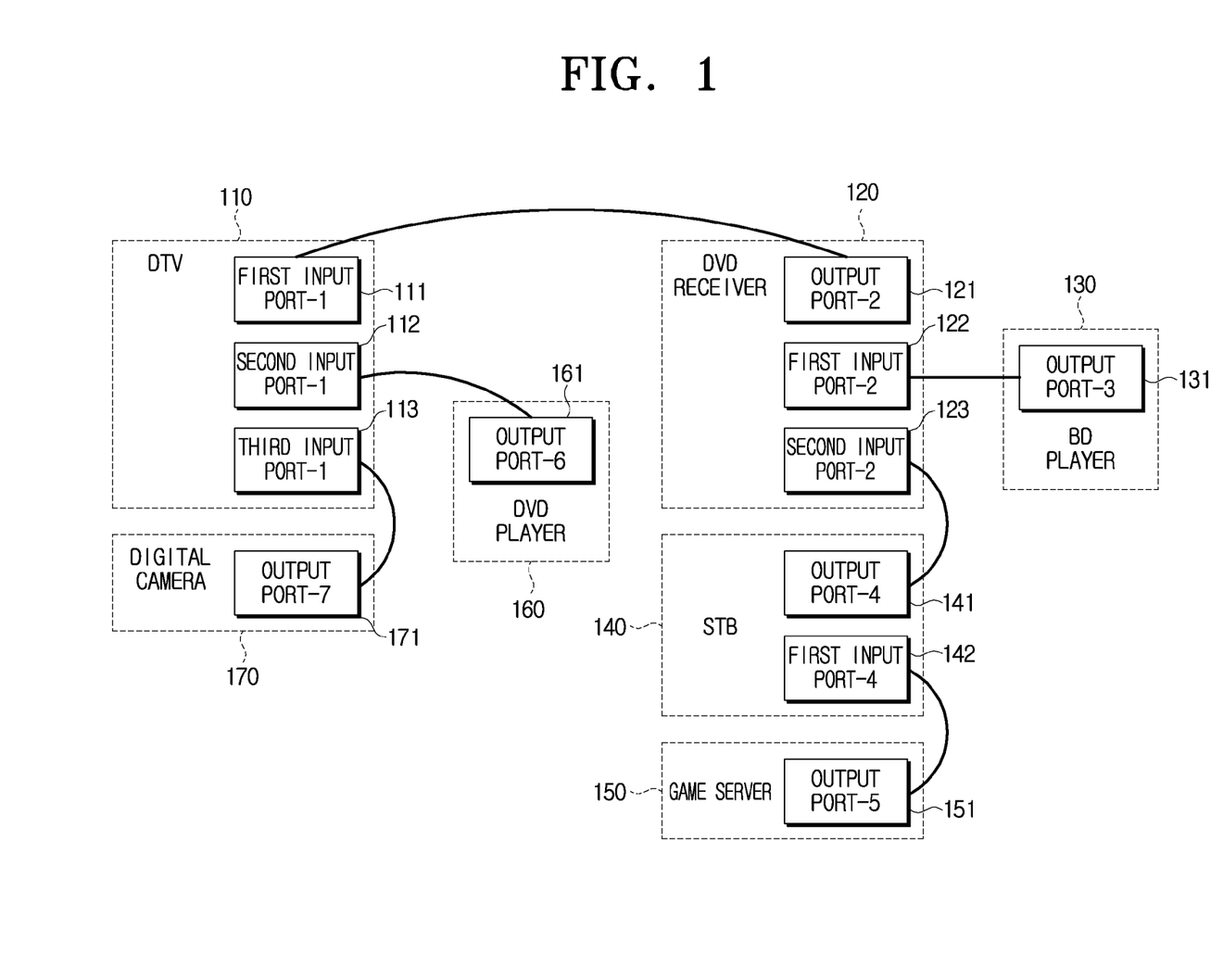
FIG. 1 is a block diagram of a video system to which the present invention is applicable.

FIG. 1 is a block diagram of a video system to which the present invention is applicable. FIG. 1 shows the video system connected according to a High Definition Multimedia Interface (HDMI) Consumer Electronics Control (CEC) specification. The video system of FIG. 1 comprises a sink positioned at the highest level of a link for receiving AV data, a source for transmitting AV data to the sink, and a switch for switching the input to a device having a HDMI input and output (I/O) port. In the video system of FIG. 1, a DTV 110 corresponds to the sink, and a DVD receiver 120, a BD player 130, a STB 140, a game server 150, a DVD player 160, and a digital camera 170 correspond to the source. The DVD receiver 120 and the STB 140 of the sources can function as the switch. The sink may be of other various implementations including computer monitors.

Figure 2:
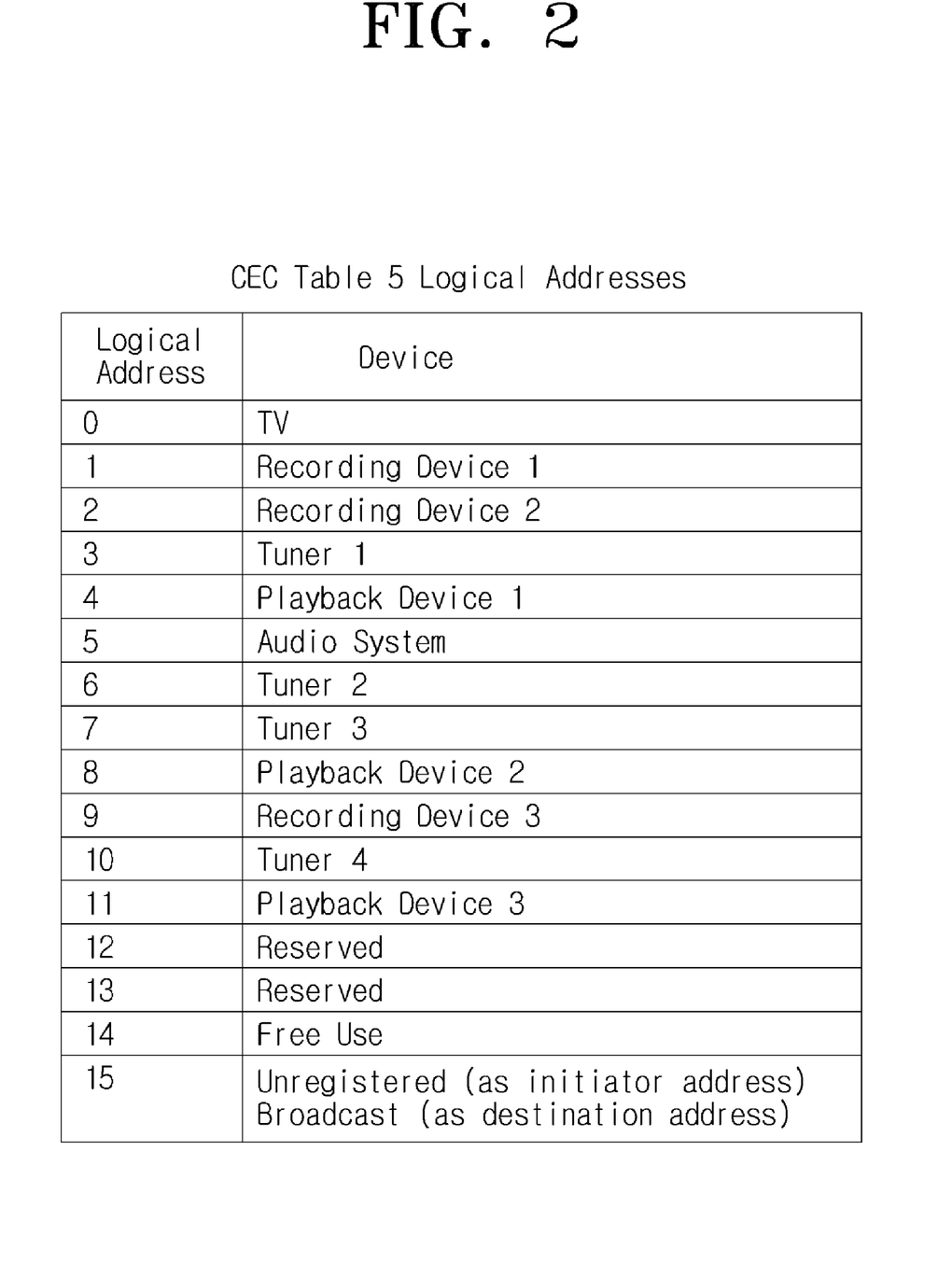
FIG. 2 is a diagram of logical addresses of CEC specification.

Logical addresses are allocated through the source's ping, and FIG. 2 shows logical addresses of CEC specification. Each source is assigned a unique logical address applied to its type through the ping. In the video system of FIG. 1, through the ping, the DTV 110 can obtain the logical address '0', the DVD receiver 120 can obtain the logical addresses '4' and '5', and the DVD player 160 can obtain the logical address '8'. The other devices are assigned their unique logical addresses.

Particularly, the DVD receiver 120, which is the video apparatus having both the replay function and the audio function, has the logical address '4' of the replay function and the logical address '5' of the audio function. The DVD receiver 120 can perform the replay function and the audio function at the same time or separately.

Each source acquires its physical address through HDMI Hot Plug Detection (HPD). The physical address closely relates to an input port of the sink and/or the switch. Thus, in the video system of FIG. 1, the DVD receiver 120 is connected to a first input port-1 111 of the DTV 110 being the sink and assigned the physical address (1, 0, 0, 0), and the BD player 130 is connected to the first input port-1 111 of the DTV 110 and a first input port-2 122 of the DVD receiver 120 and assigned the physical address (1, 1, 0, 0). Likewise, the physical addresses of the STB 140, the game server 150, the DVD player 160, and the digital camera 170 are (1, 2, 0, 0), (1, 2, 1, 0), (2, 0, 0, 0), and (3, 0, 0, 0) respectively. Those logical address and physical address allocating methods are the well-known art and thus not described in further detail.

Figure 3:
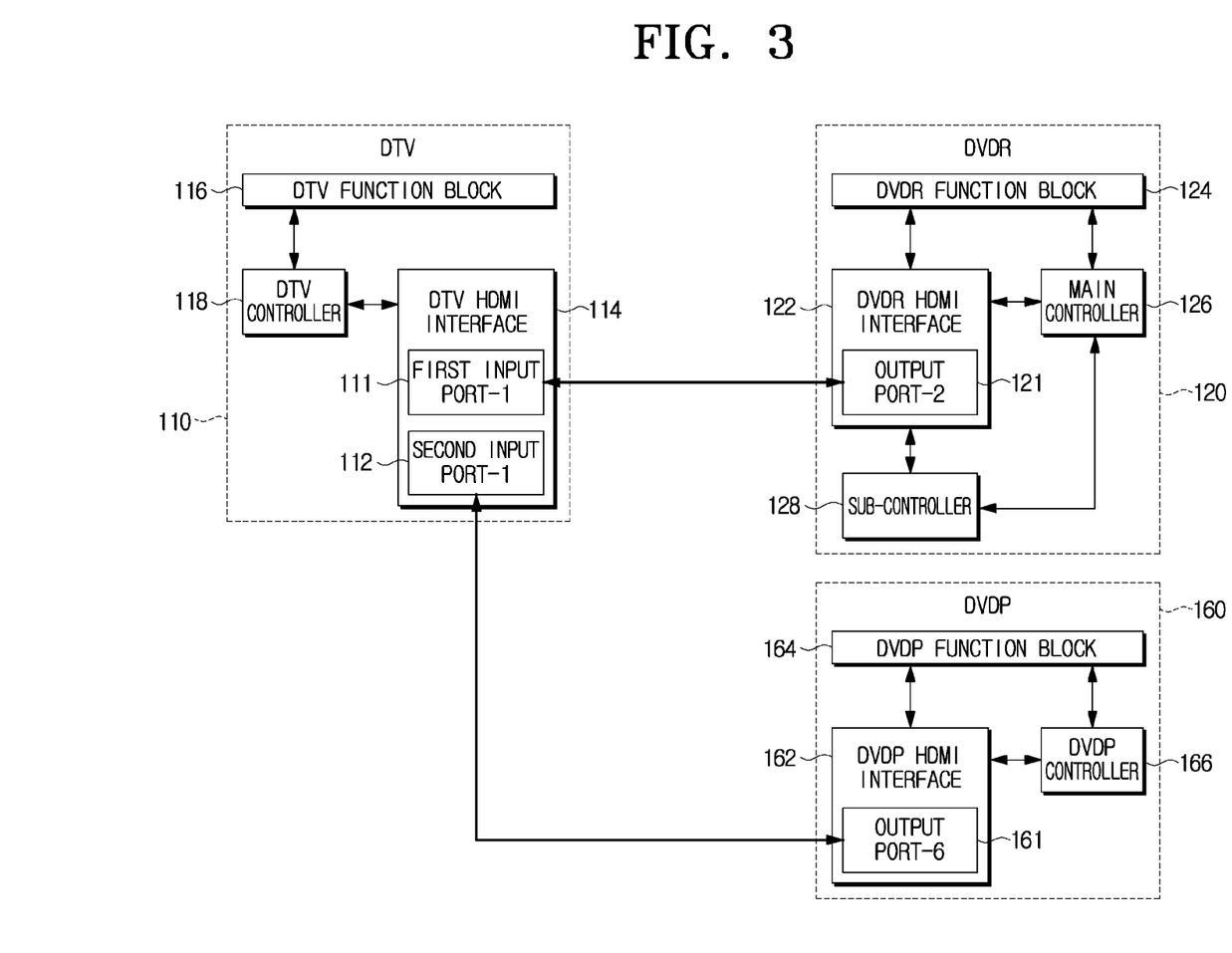
FIG. 3 is an internal block diagram of the video system according to an exemplary embodiment of the present invention.
Figure 4:
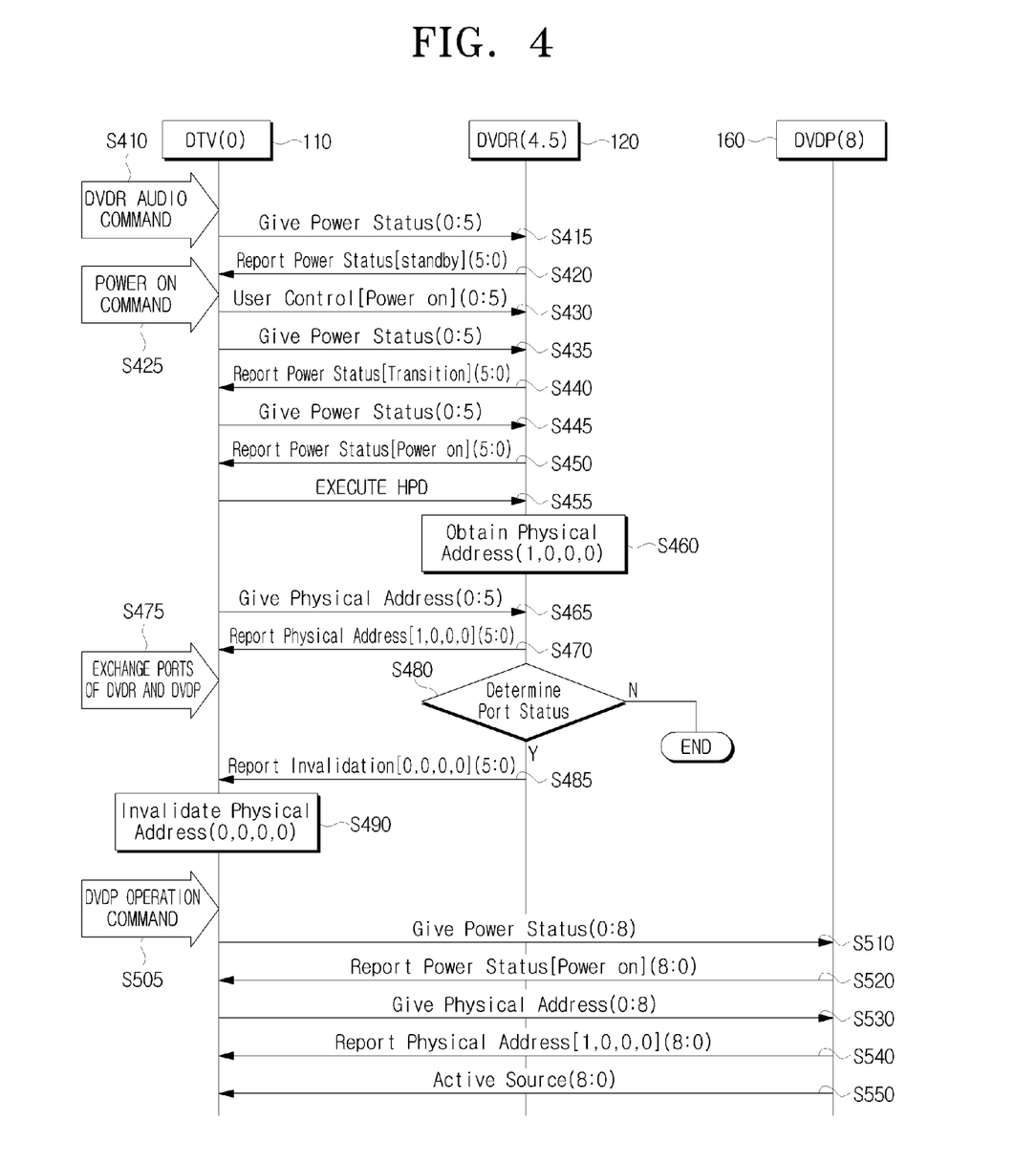
FIG. 4 is a flowchart of a method for invalidating an acquired physical address when a port is changed according to an exemplary embodiment of the present invention.

Now, descriptions explain a case where a user changes the ports connecting the DTV 110 to the DVD receiver 120 and the DVD player 160 by referring to FIGS. 3 and 4. The video system of FIG. 3 is constituted by connecting the DTV 110 to external devices according to the HDMI CEC specification.

The DTV 110 of FIG. 3 comprises a DTV function block 116, a DTV HDMI interface 114, and a DTV controller 118.

The DTV HDMI interface 114 is connected to sources according to the HDMI CEC specification to transmit and receive video signals and message between the DTV 110 and the source.

The DTV function block 116 executes proper functions of the DTV 110. In more detail, the DTV function block 116 decodes and scales a broadcast signal received from a broadcast station by cable or by radio and displays the processed broadcast signal on a display to provide a broadcast screen to the user. The DTV function block 116 may display a video corresponding to the video signal received from the source through the DTV HDMI interface 114 on the display.

The DTV controller 118 controls the operation of the DTV function block 116 according to a user command. The DTV controller 118 may control operations of the sources by sending a control command to the sources through the DTV HDMI interface 114.

Also, the DTV controller 118 can acquire logical addresses of the sources by discovering the sources connected through the DTV HDMI interface 114.

The DTV controller 118 directs the sources to check their logical addresses by broadcasting an address reset command prior to the discovery. In other words, the DTV controller 118 discovers the sources after a certain time elapses after the transmission of the address reset command.

The DTV controller 118 waits the certain time after the address reset command transmission to give the sources the time required to check their logical addresses and change the address if necessary.

As shown in FIG. 3, the source DVD receiver (hereafter, referred to as a DVDR) comprises a DVDR HDMI interface 122, a DVDR function block 124, a main controller 126, and a sub-controller 128.

The DVDR HDMI interface 122 is connected to the DTV 110 according to the HDMI CEC specification to transmit and receive AV data and messages between the DTV 110 and the DVD receiver 120.

The DVDR function block 124 executes proper functions of the DVD receiver 120. In more detail, the DVD receiver 120 comprises an audio function block for processing and outputting an audio signal to an amplifier (not shown) of the DVD receiver 120, and a replay function block for processing and outputting a video signal (which may comprise both video signal and audio signal) to the DTV 110.

As mentioned above, the logical address of the audio function block is different from the logical address of the replay function block. It is assumed that the logical address of the audio function block of the DVD receiver 120 is '5' and the logical address of the replay function block is '4'.

The main controller 126 controls the operation of the AV device function block according to a control command of the DTV controller 118 which is fed through the DVDR HDMI interface 122. Particularly, the main controller 126 operates only when the DVD receiver 120 is turned on, and acquires the physical address of the DVD receiver 120 through the HDMI HPD.

The sub-controller 128 receives and provides a power on/off control command to the main controller 126. The sub-controller 128 operates even when the DVD receiver 120 is in a standby mode, which differs from the main controller 126 operating only in the power on mode.

When the HDMI cable is connected to the DTV HDMI interface 114, the sub-controller 128 generates and applies an invalidation message including invalidation data to the DTV 110 through the DVDR HDMI interface 122.

The DVD player 160 comprises a DVDP HDMI interface 162, a DVDP function block 164, and a DVDP controller 166.

The DVDP HDMI interface 162 is connected to the DTV according to the HDMI CEC specification to transmit and receive AV data and messages between the DTV 110 and the DTV player 160. The DVDP function block 164 executes proper functions of the DVD player 160. The DVDP controller 166 controls the operation of the AV device function block depending on a control command of the DTV controller 118 which is fed through the DVDP HDMI interface 162.

FIG. 4 is a flowchart of a method for invalidating an acquired physical address when a port is changed according to an exemplary embodiment of the present invention.

In FIG. 4, the user can input a command to execute the audio function of the DVD receiver 120 using a remote controller (S410).

When the audio function execution command is input, the DTV controller 118 sends a Give Power Status message to the DVD receiver 120 through the DTV HDMI interface 114 (S415). The sub-controller 128 of the DVD receiver 120 receives the Give Power Status message through the DVDR HDMI interface 122.

The Give Power Status message is a message for requesting information relating to whether the DVDR is turned on or not.

The sub-controller 128 generates a Report Power Status message in response to the Give Power Status message of the DVD receiver 120 and sends the generated Report Power Status message to the DTV 110 through the DVDR HDMI interface 122 (S420). In more detail, the sub-controller 128 examines the information relating to the power status of the DVD receiver 120. When the DVD receiver 120 is in the standby mode, the sub-controller 128 generates and transmits a message including the power status information of the standby mode to the DTV 110. When the sub-controller 128 generates the Report Power Status message, it is preferable that an OPERAND area of the message format contains the power status information of 'Standby'. Accordingly, the DTV controller 118 converts the Report Power Status message to a user perceptive signal form and displays the signal.

Upon determining the standby mode of the DVD receiver 120 based on the Report Power Status message, the user can input a power on command of the DVD receiver 120 using the remote controller (S425).

Thus, the DTV controller 118 generates and sends a message including the user control signal to the DVD receiver 120 (S430). When the DTV controller 118 generates the message including the user control signal, it is preferable that an OPERAND area of the message format contains the user control signal of 'Power On'.

The DTV controller 118 transmits a Give Power Status message to the DVD receiver 120 through the DTV HDMI interface 114 (S435). The sub-controller 128 generates and sends a Report Power Status message informing of the transition to the DTV 110 (S440). The transition is the change from the standby mode to the power on mode. It is preferable that the power status information of the transition is contained in the OPERAND of the message format.

The DTV controller 118 transmits the Give Power Status message to the DVD receiver 120 until a Report Power Status message informing of the power on is received (S445).

When the power is supplied to the main controller 126 and the DVD receiver 120 is turned on, the sub-controller 128 generates and transmits a Report Power Status message including the power status information of 'Power On' to the DTV 110 (S450).

Being turned on, the main controller 126 executes the HDMI HPD (S455) and acquires the physical address (S460).

Next, the DTV controller 118 generates and transmits a Give Physical Address message requesting the physical address to the DVD receiver 120 (S465). The main controller 126 generates and sends a Report Physical Address including the acquired physical address to the DTV 110 (S470).

Meanwhile, the user disconnects the HDMI cable connecting to the DVD receiver 120 from the first input port-1 111 of the DTV 111 and connects it to the second input port-1 112, and connects the HDMI cable connecting to the DVD player 160 to the first input port-1 111 of the DTV 110 (S475). That is, the ports connecting to the DVD receiver 120 and the DVD player 160 are exchanged.

The sub-controller 128 determines whether the HDMI cable is disconnected from the input port of the DTV 110 and then reconnected; that is, whether the port is connected or not (S480). While the user disconnects the HDMI cable of the DVD receiver 120 from the first input port-1 111 and connects it to the second input port-1 112 according to the present invention, the HDMI cable connection is not limited to this port. The sub-controller 128 can examine merely whether the HDMI cable is connected to the input port or not.

When the HDMI cable is connected to the input port, the sub-controller 128 generates and sends a Report Invalidation message to the DTV 110 (S485). When the sub-controller 128 generates the Report Invalidation message, it is preferable that a control signal of 'Invalidate Physical Address' is contained in the OPCODE area of the message format, and that the physical address to be invalidated is the physical address of the device assigned the logical address relating to the audio function. Note that the DVDR receiver 120 may be in the standby mode when the sub-controller 128 performs the steps S480 and S485.

The DTV controller 118 parses the control signal 'Invalidate Physical address' of the received Report Invalidation message and thus invalidates the physical address of the audio function (S490). In this embodiment of the present invention, when the DVD receiver 120 is connected to the first input port-1 111, the DTV controller 118 obtains the physical address of the audio function as (1, 0, 0, 0). After the control signal of 'Invalidate Physical Address' is received, the physical address of the audio function is changed to (0, 0, 0, 0).

When the user inputs a command to execute the audio function of the DVD receiver 120 again, the DTV 110 and the DVD receiver 120 perform the steps S410 through S460 to update the correct physical address of the audio function.

When the user inputs a command to execute the replay function of the DVD player 160 (S505), the DTV controller 118 generates and transmits a Give Power Status message to the DVD player 160 (S510).

The DVDP controller 166 generates a Report Power Status message including power status information by checking the power status of the DVD player 160 and transmits the generated Report Power Status message to the DTV 110 (S520). When the DVD player 160 is turned on, the sub-controller 128 generates and transmits a Report Power Status message including the power status information of 'Power On' to the DTV 110.

The DVDP controller 166 acquires the physical address of the DVD player 160 by executing the HPD as in the main controller 126 of the DVD receiver 120 in steps S445 and S450.

Upon receiving a Give Physical Address from the DTV 110 (S530), the DVDP controller 166 generates and transmits a Report Physical Address message including the acquired physical address to the DTV 110 (S540).

Hence, the DTV 110 acquires the logical address and the physical address of the DVD player 160, communicates data with the DVD player 160, and then receives a video signal ('Active Source') (S550).

Figure 5:
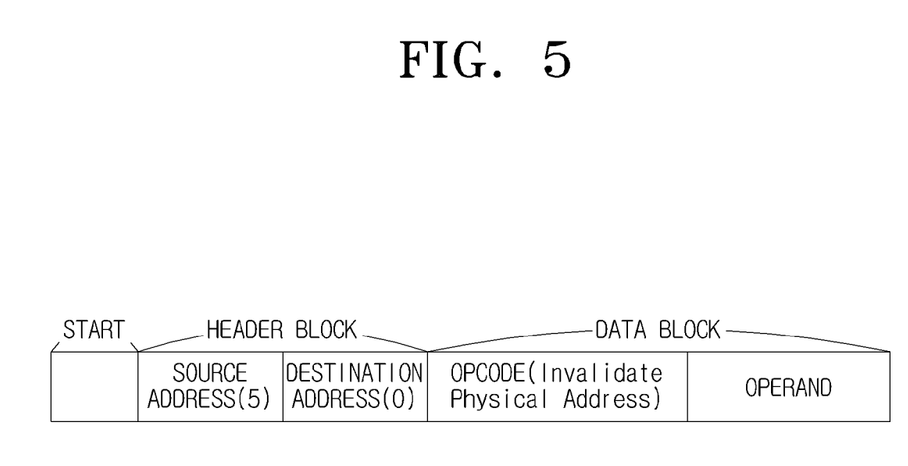
FIG. 5 is a diagram of an invalidation message according to an exemplary embodiment of the present invention.

FIG. 5 is a diagram of the invalidation message according to an exemplary embodiment of the present invention. The Invalidation message of FIG. 5 comprises a start area indicative of the start of the message, a header block area indicative of source and destination addresses, and a data block area containing data to be transmitted. The data block area can be divided to an OPCODE area and an OPERAND area. It is preferable that the control signal including the Invalidate Physical Address is contained in the OPCODE area.

So far, the process for avoiding error in the address acquisition by invalidating the address relating to the audio function when the external device is connected has been explained.

While the video system to which the present invention is applicable is constituted by connecting the DTV and the DVD receiver in FIG. 1, the present invention is applicable to the video system including other video apparatuses. Besides the DTV and the DVD receiver, the video apparatuses for constituting the video system can comprise digital video recorder (DVR), personal video recorder (PVR), hard disk driver (HDD) player, BD recorder, video cassette recorder (VCR), home theatre system, personal multimedia player (PMP), digital camcorder and so on.

In the exemplary embodiment of the present invention, when the port connection is changed, the physical address of the video apparatus assigned the logical address relating to the audio function is invalidated, but not limited to this physical address. The physical address can be a physical address of the video apparatus having not only the audio function but also the replay function and the recording function.

The control signal of the physical address is contained in the OPCODE area of the message format, but not limited to this area.

The video apparatuses constituting the video system are connected according to the HDMI CEC specification to ease the understanding of the present invention. It should be appreciated that the present invention is applicable to any scheme for transmitting and receiving video signals and messages between the video apparatuses besides the HDMI CEC specification.

As set forth above, when the port connection is changed, the physical address can be accurately updated by invalidating the former physical address. Therefore, the malfunction of the video system can be avoided. Further, since the invalidation and the update of the physical address are separated for each power state of the multifunction device, the physical address can be updated more securely and accurately.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. An address management method comprising:
    disconnecting a multifunction device from a first port of an external device;
    determining whether the multifunction device is reconnected to a second port of the external device, wherein the second port is different from the first port;
    generating an invalidation message to invalidate an address of the multifunction device after determining that the multifunction device is reconnected; and
    transmitting the generated invalidation message to the external device,
    wherein the address of the multifunction device comprises a physical address and a logical address, and
    wherein the invalidation message comprises a control signal configured to invalidate the physical address.

2. The address management method of claim 1, wherein the address relates to an audio function.

3. The address management method of claim 2, wherein the multifunction device comprises a video apparatus and the address relating to the audio function is a physical address of the video apparatus which is assigned a logical address relating to the audio function.

4. The address management method of claim 1, wherein the external device is connected according to a High Definition Multimedia Interface (HDMI) Consumer Electronics Control (CEC) specification.

5. The address management method of claim 1, further comprising:
    acquiring a physical address through a Hot Plug Detection (HPD); and
    communicating data with the external device using the acquired physical address.

6. The address management method of claim 5, wherein the invalidation message generating operation is performed when the multifunction device is in a standby mode, and
    the physical address acquiring operation is performed when the multifunction device is turned on.

7. The address management method of claim 1, wherein the control signal is transmitted in an OPCODE area of the invalidation message.

8. The address management method of claim 1, wherein the connection determining operation determines whether a port of the connected external device is changed.

9. An address management method of a video system including a first video apparatus and a second video apparatus, the method comprising:
    disconnecting the first video apparatus from a first port of the second video apparatus;
    determining, at the first video apparatus, whether the first video apparatus is reconnected to a second port of the second video apparatus, wherein the second port is different from the first port;
    after determining the reconnection of the first video apparatus, generating, at the first video apparatus, an invalidation message to invalidate an address relating to an audio function of the first video apparatus;

transmitting, at the first video apparatus, the generated invalidation message to the second video apparatus; and invalidating, at the second video apparatus, an address relating to the audio function of the first video apparatus based on the received invalidation message, wherein the address of the first video apparatus comprises a physical address and a logical address, and wherein the invalidation message comprises a control signal configured to invalidate the physical address.

10. A video apparatus comprising:
a first controller which determines whether the video apparatus is disconnected from a first port of an external device and thereafter reconnected to a second port of the external device and which generates an invalidation message to invalidate an address after the reconnection to the external device is determined, wherein the second port is different from the first port; and
an interface which transmits the generated invalidation message to the external device,
wherein the address comprises a physical address and a logical address, and
wherein the invalidation message comprises a control signal configured to invalidate the physical address.

11. The video apparatus of claim 10, wherein the address relates to an audio function.

12. The video apparatus of claim 11, wherein the address relating to the audio function is a physical address of the video apparatus which is assigned a logical address relating to the audio function.

13. The video apparatus of claim 10, wherein the external device is connected according to a High Definition Multimedia Interface (HDMI) Consumer Electronics Control (CEC) specification.

14. The video apparatus of claim 10, further comprising:
a second controller which acquires a physical address through a Hot Plug Detection (HPD), and communicates data with the external device using the acquired physical address.

15. The video apparatus of claim 14, wherein the first controller generates the invalidation message in a standby mode of the video apparatus, and
the second controller acquires a physical address in a power on mode of the video apparatus.

16. The video apparatus of claim 10, wherein the control signal is transmitted in an OPCODE area of the invalidation message.

17. The video apparatus of claim 10, wherein the first controller determines the connectivity of the external device by checking whether a port of the connected external device is changed.

18. A video apparatus comprising:
an interface which receives an invalidation message from a second video apparatus which had been disconnected from a first port and reconnected to a second port to invalidate an address of the second video apparatus connected to the video apparatus, wherein the second port is different from the first port; and
a controller which invalidates the address comprised in the invalidation message by parsing the invalidation message,
wherein the address of the second video apparatus comprises a physical address and a logical address, and
wherein the invalidation message comprises a control signal configured to invalidate the physical address.

19. The video apparatus of claim 18, wherein the address is related to an audio function of the second video apparatus.

20. The video apparatus of claim 19, wherein the address is a physical address.

21. The video apparatus of claim 18, wherein the video apparatus is a monitor.

22. The video apparatus of claim 18, wherein the invalidation message comprises a source address and a destination address.

23. The video apparatus of claim 22, wherein the invalidation message further comprises an OPCODE area.

* * * * *